Nov. 12, 1968  J. E. GLASSON  3,410,404
SORTING AND COUNTING UNIT
Filed Feb. 9, 1967  3 Sheets-Sheet 1

INVENTOR
JEAN EMILE GLASSON
BY
Woodhams, Blanchard & Flynn
ATTORNEYS

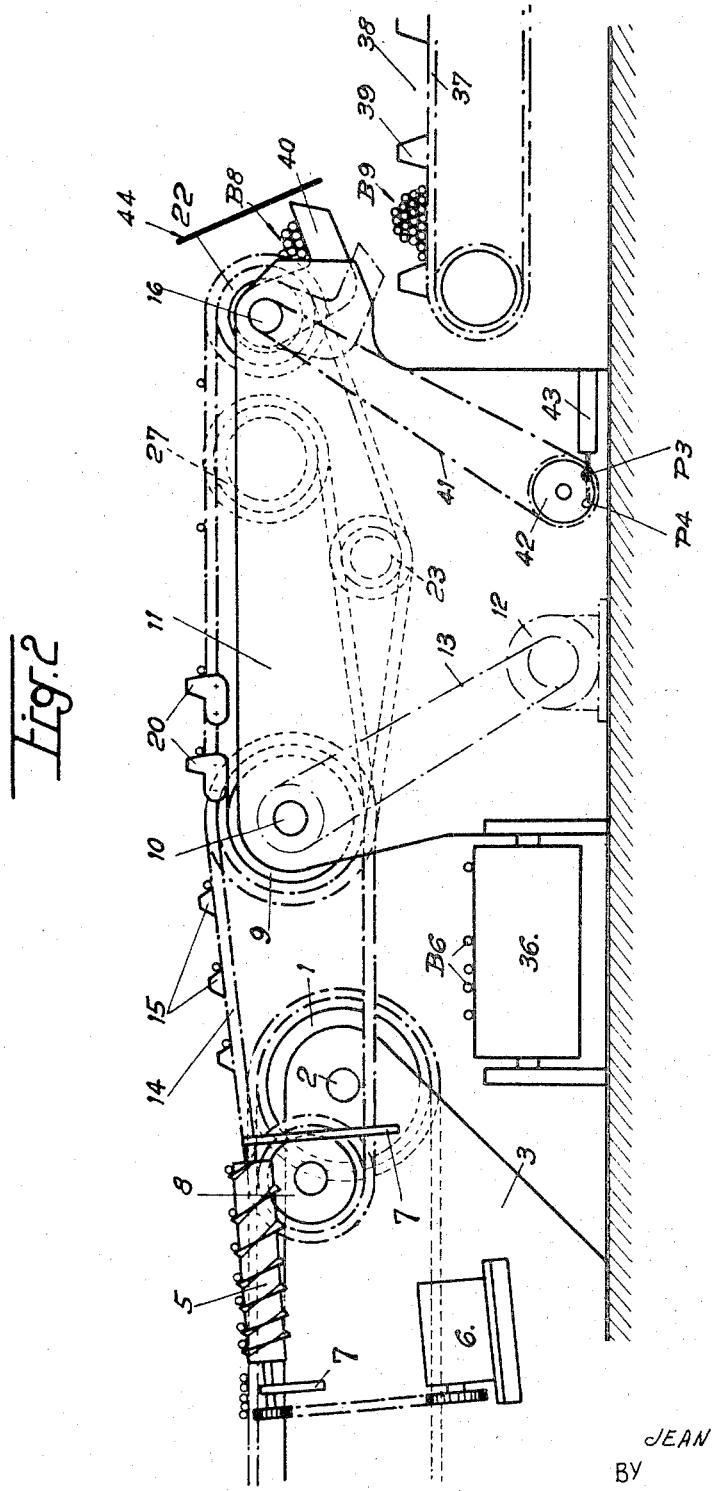

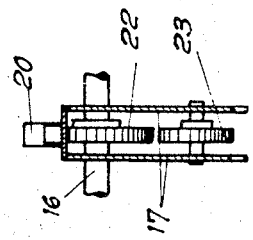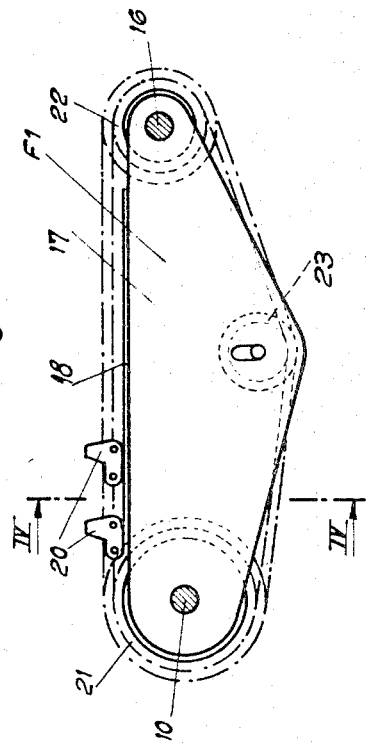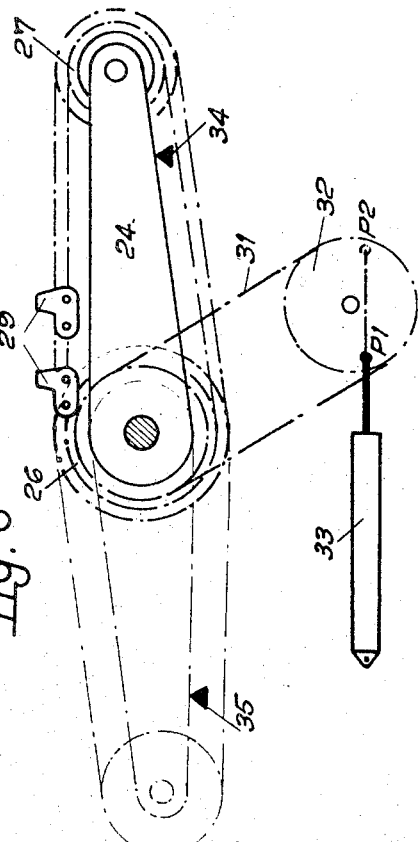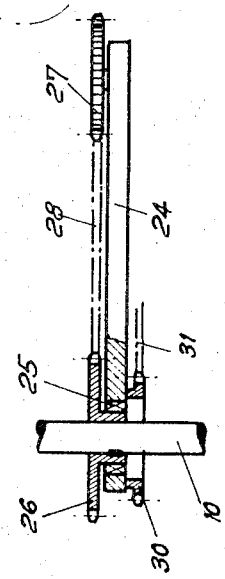

United States Patent Office 3,410,404
Patented Nov. 12, 1968

3,410,404
SORTING AND COUNTING UNIT
Jean Emile Glasson, Argenteuil, France, assignor to Societe à Responsabilite Limitee dite: Botalam, Paris, France, a corporation of France
Filed Feb. 9, 1967, Ser. No. 614,894
Claims priority, application France, Feb. 18, 1966, 50,217
11 Claims. (Cl. 209—82)

ABSTRACT OF THE DISCLOSURE

A sorting apparatus having an accelerator located along one edge of a conveyor for engaging one end of the rods carried on the conveyor and moving same forwardly at a speed which is greater than the conveyor speed to transfer the rods one at a time to a separator having a conveyor-type selector which engages the advanced end of the rods as same are discharged from the accelerator. The selector includes a plurality of pivotable arms having movable conveyor elements thereon, the arms being movable from a position adjacent the accelerator to a position remote from the accelerator whereupon the selector can be adjusted to transfer only rods having at least a predetermined minimum length.

As used in this specification, the term "sorting and counting unit" is understood to refer to that section of a metallurgical plant to which layers of parallel bars are conveyed either continuously or in batch operation, said bars being delivered from said section in piles consisting of a predetermined number of bars (counting operation) after elimination of bars which are shorter than a predetermined minimum length (sorting operation).

Accordingly, the sorting and counting unit under consideration is placed in conventional plants between the shearing section which follows the rolling-mill and upstream of the first bundling or faggoting section which is intended to form each pile of bars into compact bundles or faggots.

The term "bar" is employed in the widest sense to include rods and all structural members of varying degrees of flexibility, the length of which is substantial in relation to the cross-section, whether said cross-section is either circular or of any other configuration.

Considerable progress has been made in the field of sorting and counting operations which used to be performed by hand but which are now carried out by means of separators. A separator is made up of a series of parallel members which are driven in synchronism and provided with push-plates which each engage first the end of an accelerated bar then its successive portions progressively as they move forward. A separator of this type is described in French Patent No. 1,270,124 of July 16, 1960.

It has thus been possible by means of this machine to obtain spectacular results and, in particular, the separation of rods which are frequently presented in a more or less tangled or overlapping state. In fact, a rod or bar which is taken at one end by a push-plate is accelerated along successive portions of its length and therefore withdrawn from the layer irrespective of its position with respect to adjacent bars.

Moreover, the counting of the ends of bars thus engaged has been made possible, whilst the bars which are not engaged by the push-plate are discarded since they are discharged between the bar-layer support and the separator and fall under the action of gravity.

Finally, the bars which are taken by the separator can be collected at the downstream end in piles consisting of a predetermined number of bars which are conveyed by any suitable means to the bundling or faggoting section which follows.

Despite the substantial improvements which have thus been made, it has nevertheless proved that the increasingly high outputs which are required of metallurgical plants and the diversity of bars produced no longer permit fully reliable operation of separators of the type comprising parallel members which are driven in synchronism and constituted by push-plate wheels. In point of fact, it is found that the bars which are engaged by the push-plates progress in an irregular manner, especially in the case of bars which have a high degree of rigidity; consequently, said bars are even lifted and rock on the push-plate wheels partly outside the push-plates.

Researches carried out by the present applicant have tended to remove the disadvantages noted above by constructing the parallel members of the separator in the form of longitudinal arms and by providing chains fitted with small flights or push-plates, said chains being adapted to move around said arms between two guide sprockets and driven by a sprocket-wheel which is keyed on a common transverse driving shaft.

A noteworthy feature is that the bars which are engaged by a separator of this type, namely of the type in which the successive portions of each bar are engaged progressively by the successive push-plates of the chains starting from the accelerated end of the bar, are caused to advance on the bed of push-plate chains both in uniform array and in a completely flat position. As a result of their oblique positions at the end of the bed and their stability, the bars turn around the downstream guide sprockets of the chains and are held in position without being accidentally displaced outwards, at least over the major part of their length, and accordingly fall in a uniform manner into the container which is intended to receive the successive piles.

The foregoing description does not specify the means employed for accelerating the ends of the bars, for counting the bars and for stopping this handling operation after a predetermined number of bars have been delivered. It is true that, in principle, such a series of operations can readily be performed by hand by a single workman, especially if the output is moderate. However, modern plants which have already been developed by the present applicant employ for this purpose a selector which is relayed between the downstream sprocket of the bar layer and the upstream sprocket of the separator by means of a conveyor which is disposed horizontally or in a more or less inclined position depending on the respective levels of these two members (it will be noted that the meter which is necessary for counting the ends of the bars can readily be placed opposite to the selector or conveyor, the function of said meter being to stop the selector after the desired number of bars has passed and over a period corresponding to the time required for said bars to reach the container and for the pile to be removed).

This arrangement is particularly advantageous by reason of the fact that a space is permitted to remain between the bar layer and the separator and that only those bars which are of sufficient length to be taken first by the selector then by the conveyor will be capable of passing through said space. As a consequence, the other bars, or "short bars," fall into the space referred-to and can be removed therefrom as and when it proves necessary to do so. (It should be pointed out in this connection that the bars are always located in the layer with their ends in alignment on one side inasmuch as they have been brought in parallel relation until they come into abutting contact; it will therefore be apparent that the selector and conveyor which follows are placed on the opposite side.)

However, it has been found in practice that this arrangement is still not free from disadvantages. In point of fact, a given plant of this type effectively discards all of the short bars which are not engaged by the selector, with the result that, in practice, only those bars which are of precisely determined maximum length can be formed into faggots. However, a number of users do not require such a high degree of precision and consider it sufficient to ensure that a faggot is composed of bars which are all either longer than or equal to a predetermined length which can be either two thirds or even one-half of the maximum length. From an economic standpoint, to supply users with bars which are selected more accurately than practical requirements dictate therefore constitutes a substantial capital loss, since users are naturally unwilling to pay the extra price which results from such accurate selection.

Within the scope of this invention, the present applicant has succeeded in overcoming this major drawback by designing at least some of the arms in a constructional arrangement which is similar to that of the conveyor and by pivotally mounting said arms on the upstream driving shaft of the separator so that said arms can occupy, in addition to their position in the separator bed, a position in which they are parallel to and in alignment with the conveyor.

It is apparent that, in this manner, the push-plates of said arms engage the ends of the bars which have been conveyed thereto and that only those bars which are too short to be engaged by the arm which is most distant from the conveyor are therefore discarded. As a result of a judicious choice of the articulated arms which are aligned with the conveyor, it is therefore possible to effect the elimination only of the "short" bars if these latter are shorter than the length chosen by the user.

An installation in accordance with the invention could be designed to have articulated arms alone.

However, as a preferred feature, provision could be made alternately for one articulated arm and one stationary arm in that portion of the machine which is located in the vicinity of the conveyor and stationary arms alone in the other portion. It is in fact unnecessary to provide too large a number of articulated arms in view of the fact that, in practice, no user would accept bars having lengths of less than one half the maximum value. Moreover, in that part of the machine in which some of the arms are articulated, it is necessary to ensure that an equal number remains stationary in order to constitute the bed which receives the bars.

Furthermore, the presence of stationary arms makes it possible to mount their downstream guide sprockets so as to rotate freely on a common transverse shaft, said common downstream shaft being fitted with elbowed arms which form the bar container and adapted to take up a bar-receiving position and a bar-discharging position by means of a control system which causes said shaft to rotate through a predetermined angle either in one direction or the other.

So far as the structural design of the stationary arms and articulated arms is concerned, it is evident that a number of different solutions can be contemplated.

However, it has proved highly advantageous to construct the stationary arms in the form of vertical sideplates carried by the driving and driven shafts and spaced by a flat or slightly convex plate on which the carrying run of the push-plate chain is supported.

The articulated arms are in turn advantageously constructed in the form of a support bracket which is pivotally mounted on the upstream driving shaft in the vicinity of the driving sprocket of the chain, whilst the guide sprocket is carried on the end of said support bracket.

The above-mentioned support bracket can accordingly be fitted with a dog-clutch sprocket driven by a chain from a single shaft which effects the pivotal motion of the articulated arms, said shaft being driven by a jack.

A clear understanding of the invention will in any case be gained by consideration of the following description and accompanying drawings in which one form of execution of the invention is shown by way of example and not in any limiting sense, and in which:

FIG. 2 is a corresponding side view;

FIG. 3 is a side view of a stationary arm;

FIG. 4 is a cross-section taken along the line IV—IV of FIG. 3;

FIG. 5 is an overhead view of an articulated arm; and

FIG. 6 is a corresponding side view.

Figure 1:
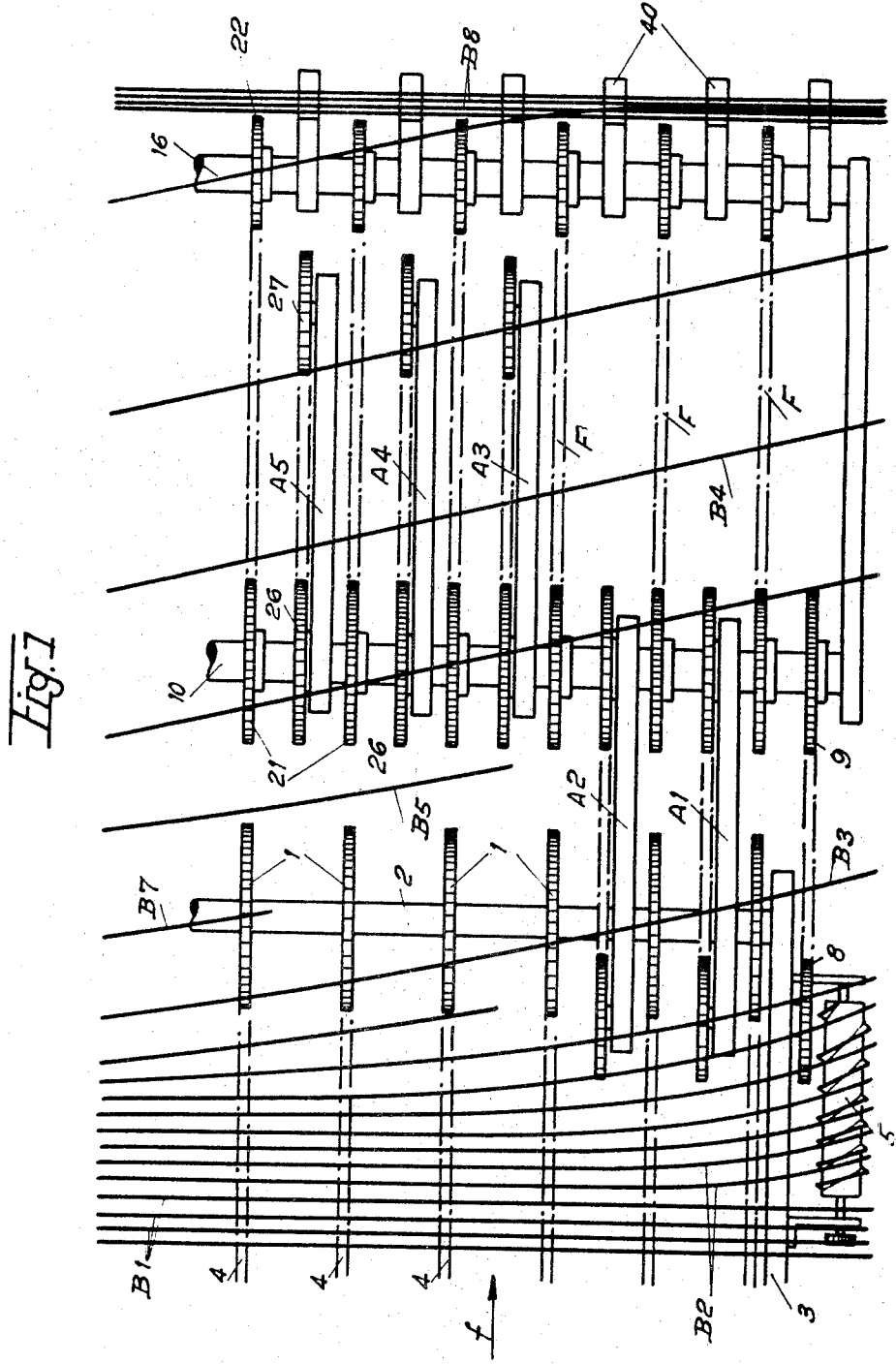
FIG. 1 is a diagrammatic and partial overhead view of an installation according to the invention.

As shown in the figures, the downstream portion of a bar-conveying element comprises a series of sprocket-wheels 1 keyed on a cross-shaft 2 which is supported at each end by a frame 3. The sprocket-wheels 1 are adapted to drive chains 4 on which the bars $B_1$ are fed in the direction of the arrow $f$. It will be noted at this point that only part of the installation is shown in FIG. 1 inasmuch as the total width of the complete unit can be substantial and is dependent on the maximum length of the bars B. Beyond the portion which is illustrated, the same elements are repeated up to a frame which is symmetrical with the one shown in the figure.

On one side of the installation, provision is made for an accelerator constituted by an endless screw or worm which is followed by a conveyor, the combined assembly of these two elements being intended to constitute the selector which will now be described.

The frame 3 carries the worm 5 of increasing pitch which is driven either from the main motor with interposition of a clutch unit or from an independent motor 6. The brackets 7 which support the worm 5 serve to place this latter in a position such as to enable it to engage the ends of the bars and to accelerate these latter by virtue of the increasing pitch of the worm while lifting said ends to a slight extent. By virtue of their flexibility, the bars therefore come into position as shown at $B_2$.

A freely-rotatable guide sprocket 8 mounted at a point located slightly upstream of the downstream end of the worm is interposed between the frame 3 which supports said sprocket and said worm. Said guide sprocket is adapted to cooperate with a sprocket 9 which is keyed on the transverse driving shaft 10 of the unit, said transverse shaft being carried by the main frame 11 and by the frame which is symmetrical therewith (but which is not shown in the drawings).

The drive to the shaft 10 is effected, for example, by a motor 12 by means of a chain 13. The two sprockets 8 and 9 are adapted to carry the chain 14 of the conveyor, the linear speed of which is chosen so that the ends of the bars which are taken by the push-plates 15 are again accelerated when they leave the worm 5. The bars thus take up positions as shown at $B_3$ and drive the separator which is constituted by a bed of chains carried by driving sprockets keyed on the upstream shaft 10 and by freely rotatable guide sprockets, a number of which are mounted on the downstream shaft 16 which is carried in the same manner as the first shaft by the frame 11 and the symmetrical frame.

FIGS. 1 and 2 show that the chains referred-to above are of two different types which are intended to cooperate either with stationary arms or with articulated arms.

A stationary arm F comprises (as shown in FIG. 3) two parallel side-plates 17 carried by the shafts 10 and 16 which are spaced by a plate 18 which may either be flat as shown in the figure or slightly convex and on which rests the carrying run of the conveyor chain 19, said chain being identical with the chain 14 and fitted with push-plates 20.

The chain is driven by the driving sprocket 21 which is keyed on the shaft 10 and supported at the end by the guide sprocket 22 which is carried by the shaft 16. The side-plates 17 are additionally adapted to carry a positionally-adjustable tensioning sprocket 23.

An articulated arm A is essentially constituted by a support bracket 24 which is pivotally mounted on a bearing 25 carried by the driving sprocket 26 which is keyed on the shaft 10; the support bracket 24 is in turn adapted to carry the guide sprocket 27. The chain 28 is also fitted with push-plates 29, as in the case of the chains mentioned above.

The support bracket 24 is fitted in turn with a sprocket 30 which is coupled by means of a chain 31 to a driving sprocket 32 which can be placed by means of a jack 33 in either one or the other of the positions defined by the points $P_1$ or $P_2$.

The point $P_1$ corresponds to a position of the support bracket shown in full lines in FIG. 6 in which the top run of the chain 28 is positioned in the bed of stationary chains 19. The support bracket can accordingly be applied against a stop 34.

The point $P_2$ corresponds to a position of the support bracket shown in chain-dotted lines in FIG. 6 in which the chain 28 comes into a position similar to that of the conveyor chain 14 and may be applied in that position against a stop 35.

It will be noted that, in both cases, the top run of the chain 28 moves forward in the direction of the arrow $f$ and that the chains 14, 19 and 28 move at the same speed. Provision can be made for only a single jack 33 for the purpose of actuating all of the articulated arms. It is in that case merely necessary, for example, to design the sprockets 30 in the form of dog-clutch units for the purpose of engaging them with or disengaging them from the arms 24 as requirements dictate.

Referring now to FIG. 1, it is apparent that the elements constituting the separator consist successively, starting from the conveyor, of five stationary arms F and five articulated arms A in alternate sequence, followed by stationary arms F alone.

In addition, the two first articulated arms $A_1$, $A_2$ have been placed in the position $P_2$ whilst the three last articulated arms are located in position $P_1$.

In consequence, the bars such as $B_3$ are displaced by the push-plates of the conveyor and arms $A_1$ and $A_2$ so as to reach the bed formed by the arms F, F, F, $A_3$, F, $A_4$, F, $A_5$, F etc. and, as said bars are taken by the push-plates which move forward in said bed, said bars accordingly take up positions such as $B_4$.

However, this process does not apply in the case of a "short" bar $B_5$ which is not engaged by the arm $A_2$.

The bar $B_5$ which is carried by the layer in the direction $f$ will therefore fall between the layer and the separator. Said bar is shown again at $B_6$ in FIG. 2, in which it is ready to be discharged at the proper time, for example by means of rollers 36.

Finally, the action of the selector which is constituted by the accelerator (worm 5) and by the conveyor (chain 14) is completed by the action of the arms $A_1$ and $A_2$, the combined assembly being adapted to effect the selection of all bars having a length which is greater than that of $B_5$ and the elimination of bars which are shorter than $B_5$. Naturally, the choice of the critical length depends on the requirements of users of bars. For this reason, provision has been made for five arms $A_1$ to $A_5$ which make it possible to meet such requirements. The five arms will be placed in a selection position in the case in which a user merely requires to ensure that the lengths of all bars received will be in excess of the length of the bar $B_7$.

During their forward progression, the selected bars $B_4$ are positioned on the separator bed in a completely flat and oblique position between the push-plates 20 and 29 and at an appreciable distance from each other.

The bars thus reach the downstream zone of the installation. At this stage, the bars usually have to be delivered to a conveyor which may be either of the chain type or any other suitable type such as the conveyor 37 which is provided with cradles 38 formed between a series of flights 39 which are rigidly fixed to the links of the chain.

If the above-mentioned conveyor can remain stationary throughout the entire period of discharge of bars which are counted so as to form a pile and subsequently a faggot, it may be considered sufficient to provide an arrangement such that the bars fall into a cradle under the action of gravity.

However, in the majority of cases, the conveyor must advance while the bars of a same pile are discharged upstream of the installation. For this reason, the shaft 16 is provided with a series of elbowed arms 40 which may be driven, for example, by means of a chain 41 from a sprocket 42 which can be placed by means of a jack 43 in two positions defined by the points $P_3$ and $P_4$. Point $P_3$ corresponds to a position of the arms 40 which is shown in full lines and in which the bars are collected as shown at $B_8$. In the case in which the bars to be handled have a high degree of rigidity, a plate such as the plate 44 can be mounted downstream of the separator for the purpose of guiding said bars towards the container which is constituted by the arms 40.

When all the bars of a sample pile have been counted then discharged at $B_8$, the jack 43 moves to position $P_4$ and the arms 40 move into the position shown in chain-dotted lines, whereupon the bars are discharged at $B_9$ into a cradle 38 of the conveyor 37. Immediately afterwards, the jack 43 returns to position $P_3$ and the arms return to their receiving positions. The conveyor 37 need therefore remain stationary only during the short time interval which corresponds to the back and forth motion $P_3$–$P_4$–$P_3$.

What I claim is:

1. An apparatus for sorting elongated rod-like members, said members being supplied to said apparatus by a conveyor device which moves said members in a direction transverse to the length thereof, said apparatus comprising:
    accelerator means adapted to engage one end of the rod-like members transported by said conveyor device and thereby accelerate the advancement of said one end of the members relative to the other end thereof;
    separator means positioned adjacent said accelerator means and adapted to separate said members delivered thereto by said accelerator means and to transport said members to a discharge station; and
    said separator means including selector means adapted to engage the one end of selected rod-like members having a predetermined minimum length, after same has been advanced by said accelerator means, and then progressively engaging successive longitudinally spaced portions of said selected members for transferring said selected members from said conveyor device to said separator means.

2. An apparatus as defined in claim 1, wherein said selector means includes:
    a plurality of substantially parallel selector arms;
    a drive element rotatably mounted adjacent one end of each of said arms;
    a driven element rotatably mounted adjacent the other end of each of said arms;
    an endless flexible member supported on and in driving engagement with the drive and driven elements positioned adjacent each of said arms;
    means on said endless flexible member for engaging said rod-like members; and
    drive means interconnected to said drive element for rotatably driving same.

3. An apparatus as defined in claim 2, wherein:

said separator means further includes a transverse drive shaft with said drive members being coaxial with and mounted on said shaft, said selector arms being pivotally mounted adjacent one end thereof on said shaft;

said selector means further including a plurality of laterally spaced, stationary support arms with said selector arms being alternately positioned between said support arms, said selector arms being pivotally movable between a first position directly between said support arms and a second position angularly displaced from said first position whereby said selector arms extend substantially outwardly from between said support arms.

4. An apparatus as defined in claim 3, wherein said separator means further includes:

a transverse support shaft laterally spaced from and substantially parallel to said transverse drive shaft;

a plurality of driven members rotatably mounted on said support shaft;

a plurality of rotatable drive members fixedly secured to said drive shaft;

conveyor means supported on and in driving engagement with said drive and driven members for supporting said rod-like members thereon;

receiver means for receiving the rod-like members discharged from said conveyor means, said receiver means including elbow-shaped arms mounted on said support shaft; and means rotating said elbow-shaped arms from a receiving station to a discharge station.

5. An apparatus as defined in claim 3, wherein said separator means includes:

a transverse support shaft laterally spaced from and substantially parallel to said transverse drive shaft;

a plurality of driven members rotatably mounted on said support shaft;

a plurality of rotatable drive members fixedly secured to said drive shaft;

conveyor means supported on and in driving engagement with said drive and driven members for supporting said rod-like members thereon; and each of said support arms including a substantially vertical plate member extending between and supported on said pair of transverse shafts, the upper edge of said support arms assisting in supporting a portion of said conveyor means on which is supported said rod-like members.

6. An apparatus as defined in claim 1, wherein said selector means includes:

a shaft extending transversely across said separator means;

a plurality of substantially parallel selector arms pivotally mounted adjacent one end thereof on said shaft;

a rotatable drive sprocket coaxially mounted on said shaft adjacent the one end of each of said selector arms;

a driven sprocket member rotatably mounted on each of said selector arms adjacent the other end thereof;

a flexible endless chain extending between and in driving engagement with said drive and driven sprockets, said chain having means thereon adapted to engage said rod-like members;

drive means drivingly interconnected with said drive sprockets for rotatably driving same; and displacement means for permitting said selector arms to be independently pivotally moved between first and second angularly displaced positions, said selector arms when in said first position having a portion thereof positioned closely adjacent said accelerator means whereupon the associated driven chain is adapted to engage the rod-like members discharged from said accelerator means, said selector arms when in said second position being spaced from said accelerator means.

7. An apparatus as defined in claim 2, wherein:

said conveyor device includes a rotatable support member adjacent the discharge end thereof and a movable conveying element supported thereon, said conveying element supporting and transporting said rod-like members thereon;

said accelerator means being positioned adjacent the discharge end of said conveyor means for engaging one end of said rod-like members for separating same;

said separator means including movable conveyor means for supporting and transporting said rod-like members, said conveyor means being laterally spaced from the moving conveyor element of said conveyor device;

said separator means further including a shaft extending trasversely relative to the direction of movement of said conveyor means with said shaft having a plurality of rotatable sprocket members supported thereon with said sprocket members being in driving engagement with said conveyor means;

said selector arms being pivotally mounted on said shaft for angular movement between first and second positions, said arms in said first position having a portion of the respective endless flexible members positioned substantially in the plane of said conveyor means and constituting a portion thereof, said arms when in said second position extending into the space between the conveyor device and said conveyor means with said arms being substantially aligned with the discharge end of said conveyor device.

8. An apparatus as defined in claim 7, wherein:

said separator means includes a plurality of substantially parallel, laterally spaced stationary support arms positioned adjacent the movable conveying element and extending in the direction of movement thereof, said plurality of arms extending laterally across the width of said conveyor means;

said selector arms being alternately laterally spaced between said support arms with said selector arms extending only across a portion of the width of said conveyor means.

9. An apparatus as defined in claim 8, wherein said separator means further includes:

a second shaft parallel to and laterally spaced from said first-mentioned shaft, said second shaft having a plurality of sprockets rotatably mounted thereon with said sprockets being in driving engagement with said conveyor means;

receiver means for receiving said rod-like members discharged from said conveyor means, said receiver means including elbow-shaped arms mounted on said shaft with said arms functioning as a container; and means for rotating said arms from a receiving position to a discharge position.

10. An apparatus as defined in claim 9, wherein:

said support arms each comprise a substantially vertical plate extending between and rotatably supported on said pair of shafts, the upper edge of said support arms assisting in supporting the portion of the conveyor means on which are supported the rod-like elements;

the drive and driven elements of said selector means comprising sprocket members with the driven sprocket members being rotatably mounted on the selector arms adjacent the free ends thereof, said endless flexible members comprising chains supported on and in driving engagement wtih the drive and driven sprockets with said chains having means thereon adapted to engage said rod-like members.

11. An apparatus as defined in claim 10, further including:

power means for moving said selector arms between said first and second positions, said power means including a sprocket secured to said drive shaft, a second sprocket laterally displaced from said first sprocket, a chain drivingly interconnecting said first and second sprockets, and a jack connected to said second sprocket for rotating same about its axis whereupon said selector arm is movable between said first and second positions, each of said selector arms being movable independently of one another.

References Cited

FOREIGN PATENTS 1,334,415  7/1963  France.

RICHARD E. AEGERTER, *Primary Examiner*